(12) United States Patent
Haddon et al.

(10) Patent No.: US 6,641,793 B2
(45) Date of Patent: *Nov. 4, 2003

(54) METHOD OF SOLUBILIZING SINGLE-WALLED CARBON NANOTUBES IN ORGANIC SOLUTIONS

(75) Inventors: Robert C. Haddon, Riverside, CA (US); Jian Chen, Richardson, TX (US)

(73) Assignee: University of Kentucky Research Foundation, Lexington, KY (US)

(*) Notice: Subject to any disclaimer, the term of this patent is extended or adjusted under 35 U.S.C. 154(b) by 267 days.

This patent is subject to a terminal disclaimer.

(21) Appl. No.: 09/795,957

(22) Filed: Feb. 28, 2001

(65) Prior Publication Data

US 2001/0010809 A1 Aug. 2, 2001

Related U.S. Application Data

(63) Continuation-in-part of application No. 09/401,668, filed on Sep. 22, 1999, now Pat. No. 6,331,262.
(60) Provisional application No. 60/102,909, filed on Oct. 2, 1998, and provisional application No. 60/102,787, filed on Oct. 2, 1998.

(51) Int. Cl.[7] .................................................. D01F 9/12
(52) U.S. Cl. ................................. 423/447.2; 423/447.1
(58) Field of Search ........................... 423/447.1, 460, 423/447.2

(56) References Cited

U.S. PATENT DOCUMENTS

| | | | |
|---|---|---|---|
| 5,560,898 A | 10/1996 | Uchida et al. | |
| 5,641,466 A | 6/1997 | Ebbesen et al. | |
| 5,695,734 A | 12/1997 | Ikazaki et al. | |
| 5,698,175 A | 12/1997 | Hiura et al. | |
| 5,716,708 A | 2/1998 | Lagow | |
| 6,187,823 B1 * | 2/2001 | Haddon et al. | 516/32 |
| 6,331,262 B1 * | 12/2001 | Haddon et al. | 252/502 |

FOREIGN PATENT DOCUMENTS

WO          97-32571          9/1997

* cited by examiner

*Primary Examiner*—Stuart L. Hendrickson
(74) *Attorney, Agent, or Firm*—King & Schickli, PLLC

(57) ABSTRACT

Naked single-walled nanotube carbon metals and semiconductors are dissolved in various organic solutions.

36 Claims, 8 Drawing Sheets

(10,10) SWNT-CONH(CH$_2$)$_{17}$CH$_3$ (10,10) SWNT-CONH(CH$_2$)$_{17}$CH$_3$

```
┌─────────────────────────────────────────────────────────────────┐
│  AP-SWNTs (40-60 vol.%) were refluxed in 70 vol.% nitric        │
│  acid until the evolution of dense brown vapors ceases.         │
│         (for 4g raw soot, this usually take 10-12 hours).       │
└─────────────────────────────────────────────────────────────────┘
                                │
┌─────────────────────────────────────────────────────────────────┐
│      After centrifugation, the supernatant liquid was decanted. │
│       The solid precipitate was washed several times with distilled │
│  water until the pH of the washings is close to 7. The supernatant liquid is removed by │
│                  centrifugation and decantation.                │
└─────────────────────────────────────────────────────────────────┘
                                │
          ┌──────────────────────────────────────────────┐
          │  The resulting solid was washed with ethyl alcohol │
          │  and dried at room temperature under reduced pressure. │
          │     The purity of the SWNTs is around 70-80 vol.%.  │
          └──────────────────────────────────────────────┘
```

FIG. 11

```
┌─────────────────────────────────────────────────────────────────┐
│        The purified SWNTs were sonicated in a mixture (1:2-3) of │
│            70% nitric acid and 98% sulfuric acid for 24-48 hours │
│              (500-1000 ml acid mixture per gram of purified SWNTs). │
│          The temperature is controlled to be lower than 60°C.   │
└─────────────────────────────────────────────────────────────────┘
                                │
┌─────────────────────────────────────────────────────────────────┐
│          The resulted mixture was diluted 3-4 times by pouring into │
│  distilled water. The solid was isolated by membrane filtration (200 nm pore size), │
│  washed with a minimum amount of distilled water, and dried at room temperature │
│            under reduced pressure to give shortened SWNTs.      │
└─────────────────────────────────────────────────────────────────┘
```

FIG. 12

METHOD OF SOLUBILIZING SINGLE-WALLED CARBON NANOTUBES IN ORGANIC SOLUTIONS

This application is a continuation-in-part of U.S. patent application Ser. No. 09/401,668 filed Sep. 22, 1999, now U.S. Pat. No. 6,331,262 which claims the benefit of U.S. Provisional Application No. 60/102,909 filed Oct. 2, 1998 and U.S. Provisional Application No. 60/102,787 filed Oct. 2, 1998.

This invention was made with Government support under NSF-EPSCOR grant EPS-9452895. The Government may have certain rights in this invention.

TECHNICAL FIELD

The present invention relates to the dissolution of single walled carbon nanotubes in solutions and more particularly, to a method of dissolving naked single walled nanotube carbon metals and semiconductors in organic solutions.

BACKGROUND OF THE INVENTION

All previous work on carbon nanotubes (both single-walled and multi-walled), has been carried out on the usual intractable, insoluble form of this material [Yakobson, B. I.; Smalley, R. E., Fullerene Nanotubes: C1,000.000 and Beyond. American Scientist 1997, 85, 324–337.] This form of the material is not amenable to many of the processing steps that are necessary if the single-walled carbon nanotubes (SWNTs) are to reach their full potential—particularly in applications that require these materials in the form of polymers, copolymers, composites, ceramics and moldable forms.

While present forms of the SWNTs can be heterogeneously dispersed in various media, the interactions between the SWNTs and host and between the SWNTs themselves are simply physical, and without the formation of chemical bonds. Thus, the advantageous properties of the SWNTs are unlikely to be realized on a macroscopic level. What is needed is a method to prepare well-dispersed forms of SWNTs perhaps by inducing them to exfoliate from the bundles and dissolve in organic solvents. Although long believed to be impossible, [Ebbesen, T. W., Cones and Tubes: Geometry in the Chemistry of Carbon. Acc. Chem. Res. 1998, 31, 558–566] we now teach such a procedure for the dissolution of SWNTs [Chen, J.; Hamon, M. A.; Hu, H.; Chen, Y.; Rao, A. M.; Eklund, P. C.; Haddon, R. C., Solution Properties of Single-Walled Carbon Nanotubes. Science 1998, 282, 95–98].

SUMMARY OF THE INVENTION

The present invention relates to solutions of single-walled carbon nanotubes dissolved in an organic solvent. Such solutions are anticipated to be useful in determining the functionalization chemistry of the open ends, the exterior walls or convex face and the interior cavity or concave face of single-walled carbon nanotubes and processing useful nanotube based polymer, copolymer and composite products and devices for a multitude of applications in various industries including aerospace, battery, fuel cell, healthcare and electromagnetic radiation shielding.

Advantageously, as a result of the present invention, functionalization chemistry of the SWNTs can be determined through the study of both the ionic and covalent solution phase chemistry with concomitant modulation of the single wall nanotube band structure.

Additional advantages, and other novel features of the invention will be set forth in part in the description that follows and in part will become apparent to those skilled in the art upon examination of the following or may be learned with the practice of the invention. The advantages of the invention may be realized and attained by means of the instrumentalities and combinations particularly pointed out in the appended claims.

In accordance with the purposes of the present invention as described herein, a novel and improved method of dissolving single-walled carbon nanotubes and semiconductors in common organic solutions is provided. In one possible embodiment, the method comprises purifying the single-walled carbon nanotubes and terminating open ends thereof with carboxylic acid groups. This may be followed by shortening the single-walled carbon nanotubes to a length of between substantially 1–1000 nm. Next is the polishing of the single-walled carbon nanotubes. Then follows the converting of the carboxylic acid groups on the open ends to acid chloride groups. This is followed by the reacting of the single-walled carbon nanotubes with an amine or alkylaryl amine having a formula $RNH_2$, or $R_1R_2NH$ wherein R, $R_1$ and $R_2$=—$(CH_2)_nCH_3$ where n=9–50 or R, $R_1$ and $R_2$=—$(C_6H_4)(CH_2)_nCH_3$ where n=5–50. The final step is the dissolving of the reacted single-walled carbon nanotubes in the organic solvent. In the method, $RNH_2$ may be a compound selected from a group including octadecylamine, 4-dodecylaniline, 4-tetradecylaniline and any mixtures thereof.

In yet a second possible embodiment, unshortened single walled carbon nanotubes are dissolved in common organic solutions. This is accomplished by eliminating the shortening step.

In a third possible embodiment, the carbon nanotubes' open ends are reacted with long chain amines, eliminating the step of terminating the open ends with carboxylic acid groups. This is followed by the reacting of the single-walled carbon nanotubes with an amine or alkylaryl amine having a formula $RNH_2$, or $R_1R_2NH$ wherein R, $R_1$ and $R_2$=—$(CH_2)_nCH_3$ where n=9–50 or R, $R_1$ and $R_2$=—$(C_6H_4)(CH_2)_nCH_3$ where n=5–50. The final step is the dissolving of the reacted single-walled carbon nanotubes in the organic solvent. In the method, $RNH_2$ may be a compound selected from a group including octadecylamine, 4-dodecylaniline, 4-tetradecylaniline and any mixtures thereof.

In accordance with yet another aspect of the present invention, novel solutions are provided comprising single-walled carbon nanotubes dissolved in organic solvents. The organic solvents are preferably aromatic or chlorinated solvents. Solvents in which the SWNTs of the present invention may be solubilized include but are not limited to chloroform, dichloromethane, benzene, toluene, chlorobenzene, dichlorocarbene, ether, tetrahydrofuran, trichlorobenzene, methylene chloride, diethylene glycol, dimethyl ether, carbon disulfide, tetrachlorocarbon, pyridine, quinoline, dichloroethane, diethyl ether, xylene, naphthalene, nitrobenzene and mixtures thereof. The single-walled carbon nanotubes dissolved in the organic solvent when shortened have a length between 1–1000 nm and a diameter between 0.5–100 nm and are connected via amide linkages to branched or unbranched alkyl chains of 5 and more preferably 9 or more carbon atoms in length.

Advantageously, such a solution not only allows the study of the functionalization chemistry of the open ends, the exterior walls or convex face and the interior cavity or concave face of the nanotubes, but also processing of the nanotubes into useful products for various applications including as intermediates in the preparation of polymer, copolymer and composite materials.

Still other objects of the present invention will become apparent to those skilled in this art from the following description wherein there is shown and described a preferred embodiment of this invention, simply by way of illustration of one of the modes and alternate embodiments best suited to carry out the invention. As it will be realized, the invention is capable of still other and different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serve to explain the principles of the invention. In the drawing:

FIG. 11 is a block diagram illustrating a second procedure for purifying the SWNTs; and FIG. 12 is a block diagram illustrating a first preferred method for shortening purified SWNTs.

Reference will now be provided in detail to the present preferred embodiment of the invention, an example of which is illustrated in the accompanying drawings.

DETAILED DESCRIPTION OF THE INVENTION

In the novel method of the present invention, we begin with raw, as prepared SWNT (AP-SWNTs) soot which may be obtained from CarboLex, Inc. of Lexington, Ky. This is prepared by use of an electric arc technique similar to that described by Journet, C.; Maser, W. K.; Bernier, P.; Loiseau, A.; Lamy de la Chappelle, M.; Lefrant, S.; Deniard, P.; Lee, R. and Fischer, J. E., in Large Scale Production of Single-Walled Carbon Nanotubes by the Electric-Arc Technique. Nature 1997, 388, 756–758. The estimated purity of this material is 40–60% SWNT by volume. Batches of 10 grams may be prepared in a single run and there is considerable scope for further increase in scale. Thus it is possible to contemplate the very large-scale production of this material in the future. We describe herein routes to soluble SWNTs (s-SWNTs), starting from AP-SWNTs.

In a first possible embodiment of this procedure, the AP-SWNTs are (1) Purified, (2) Shortened, (3) Polished, (4) Converted from the carboxylic acid-terminated form to the acid chloride-terminated form, and (5) Converted from the acid chloride-terminated form to the long chain amide-terminated form, during which the bundles are exfoliated into a mixture of individual SWNTs and small bundles of SWNTs. This latter material is soluble in a number of organic solvents and is thus suitable for further chemical reactions. The chemical reactions used to effect this transformation of the carboxylic acid functionalized SWNTs are shown below.

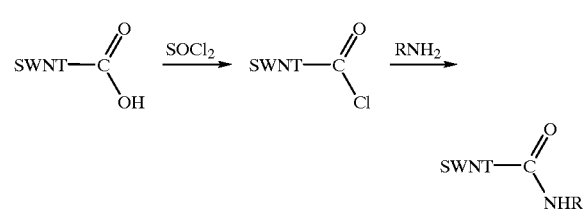

In a second possible embodiment of this procedure, full length or unshortened SWNTs are solubilized. This is accomplished using a simplified procedure which advantageously preserves the length of the SWNTs, which is one of their primary attractions in many applications. In yet a third possible embodiment, the step of terminating open ends of SWNTs with carboxylic acid groups is replaced with directly reacting the open ends with long chain amides such as octadecylamine.

Purification is often (but not always) a desired step because the AP-SWNTs contain extraneous material, beside the approximately 40–60% SWNTs by volume. In particular the AP-SWNTs contain metal catalyst (nickel and yttrium), nanoparticles (carbonaceous particles sometimes containing metals), graphite, amorphous carbon, fullerenes and other contaminants.

Figure 10:
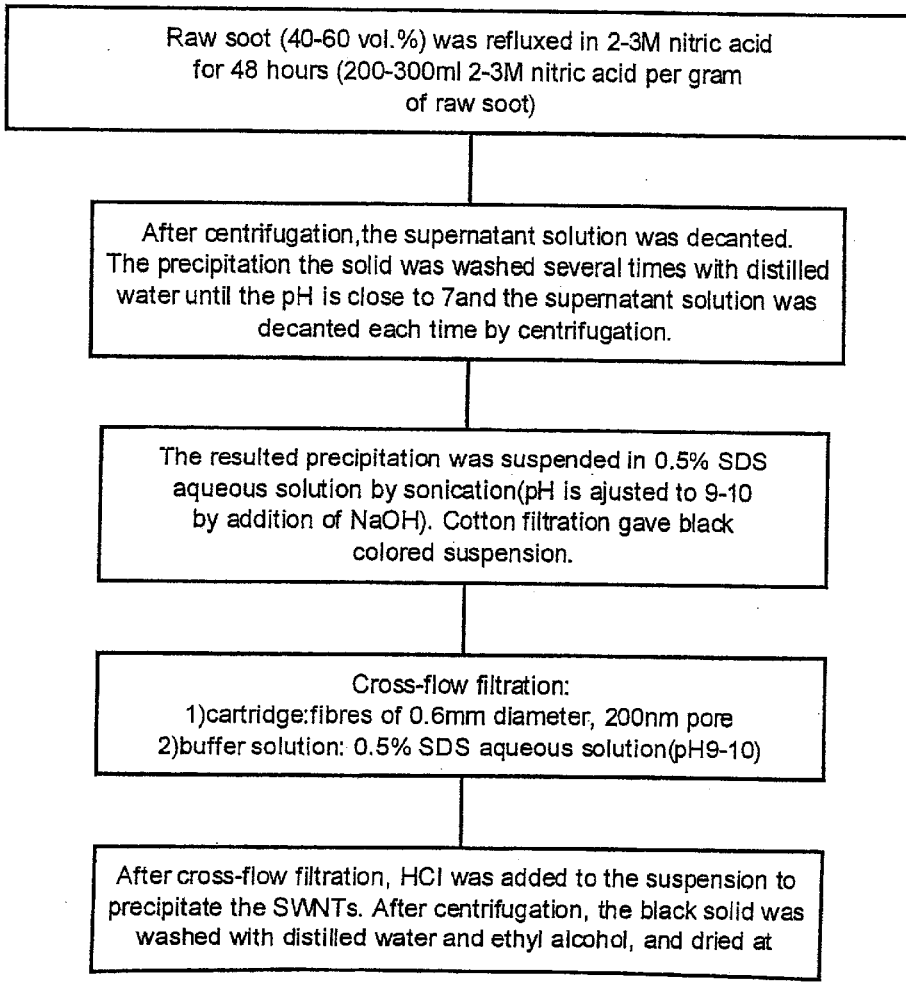
FIG. 10 is a block diagram illustrating a first procedure for purifying the SWNTs.

A first purification procedure is illustrated in FIG. 10. This procedure is a variation of a previously published method [Liu, J.; Rinzler, A. G.; Dai, H.; Hafner, J. H.; Bradley, R. K.; Boul, P. J.; Lu, A.; Iverson, T.; Shelimov, K.; Huffman, C. B.; Rodriguez-Macias, F.; Shon, Y. -S.; Lee, T. R.; Colbert, D. T.; Smalley, R. E., Fullerenes Pipes. Science 1998, 280, 1253–1255] [Rinzler, A. G.; Liu, J.; Dai, H.; Nilolaev, P.;

Huffman, C. B.; Rodriguez-Macias, F. J.; Boul, P. J.; Lu, A. H.; Heymann, D.; Colbert, D. T.; Lee, R. S.; Fischer, J. E.; Rao, A. M.; Eklund, P. C.; Smalley, R. E., Large-Scale Purification of Single-Wall Carbon Nanotubes: Process, Product and Characterization. Appl. Phys. A 1998, 67, 29–37].

AP-SWNTs (40–60 vol. % of SWNTs) are refluxed in 2–3M nitric acid for about 48 hours (200–300 ml 2–3M nitric acid per gram of AP-SWNTs). After centrifugation, the supernatant solution is decanted. The pH of the solid is adjusted to about 7 by monitoring the pH of the supernatant liquid through repeated cycles of washing, centrifigation and decantation.

The resulting solid is suspended in an 0.5% aqueous solution of sodium dodecyl sulfate (SDS) by sonication for 2–4 hours (200–400 ml surfactant solution per gram of AP-SWNTs); the solution pH is then adjusted to 9–10 by addition of sodium hydroxide. Filtration through a cotton plug gives a black-colored suspension.

The resulting suspension is subjected to cross-flow filtration (CFF). The CFF cartridge has the following specifications: fiber diameter of 0.6 mm, pore size of 200 nm and surface area of 0.56 m$^2$. The buffer solution is made up to contain 0.5% SDS at a pH of 9–10 (adjusted by addition of NaOH). Initially the filtrate is black. The CFF is halted when the filtrate has become light brown. HCl is added to the resulting suspension to terminate the open ends of the SWNTs with carboxylic acid groups (~COOH $v_{C=O}$=1719 cm$^{-1}$) rather than carboxylate groups (~COO$^-$, $V_{C=O}$= 1620 cm$^{-1}$).

After centrifugation, the black solid is washed with distilled water and ethyl alcohol and dried at room temperature. The purity of the resulting SWNTs is around 90 vol. %, and the yield is 10–30% (based on AP-SWNTs).

A specific example of this purification procedure is found below in Example 1.

EXAMPLE 1

AP-SWNTs (6.3 g) were refluxed in 700 mL of 2 M HNO$_3$ for 48 hrs (oil bath at 130° C.). The mixture was centrifuged at 2000 rpm for 30 min. The acid layer was discarded and the solid was washed with water and then mixed into a 0.5% wt. solution of SDS in water (1500 mL). NaOH was added to the solution until the pH was above 10. The mixture was sonicated for 10 hrs. The suspension was acidified with HCl so that the acid form of the SWNTs precipitated and then it was centrifuged at 2000 rpm for 30 min. The water layer was decanted and passed through a membrane filter, pore size 1.2 μm. The solid slurry was then subjected to membrane filtration. Yield: 2.35 g.

A second or alternative purification procedure is illustrated in FIG. 11. This procedure is also a variation of a previously published method [Ebbesen, T. W.; Dujardin, E.; Krishnan, A.; Treacy, M. M. J., Purification of Single-Shell Nanotubes. Adv. Mater. 1998, 10, 611–613]. It is simpler, but less complete than the first purification procedure.

AP-SWNTs (40–60 vol. % of SWNTs) are refluxed in 70% nitric acid until the emission of dense brown vapors ceases (for 4 g AP-SWNTs, this usually takes 10–12 hours). After centrifugation, the brown-colored supernatant solution is decanted. The pH of the solid is adjusted to about 7 by monitoring the pH of the supernatant liquid through repeated cycles of washing, centrifugation and decantation.

The resulting solid is washed with ethyl alcohol and dried at room temperature under reduced pressure. The purity of the SWNTs is around 70–80 vol. %, and the yield is 40–50%.

In a preferred embodiment of the present procedure, the next step is the shortening of the SWNTs (see illustration in FIG. 12). This aids in their dissolution in organic solvents.

A first shortening technique is a variation of a previously published method. [Liu, J.; Rinzler, A. G.; Dai, H.; Hafner, J. H.; Bradley, R. K.; Boul, P. J.; Lu, A.; Iverson, T.; Shelimov, K.; Huffman, C. B.; Rodriguez-Macias, F.; Shon, Y. -S.; Lee, T. R.; Colbert, D. T.; Smalley, R. E., Fullerenes Pipes. Science 1998, 280, 1253–1255] [Rinzler, A. G.; Liu, J.; Dai, H.; Nilolaev, P.; Huffman, C. B.; Rodriguez-Macias, F. J.; Boul, P. J.; Lu, A. H.; Heymann, D.; Colbert, D. T.; Lee, R. S.; Fischer, J. E.; Rao, A. M.; Eklund, P. C.; Smalley, R. E., Large-Scale Purification of Single-Wall Carbon Nanotubes: Process, Product and Characterization. Appl. Phys. A 1998, 67, 29–37.] After this process the SWNTs are reduced to lengths in the range 100–300 nm.

The purified SWNTs (70–80%) are sonicated in a 1:2–3 mixture of 70% nitric acid and 90% sulfuric acid for 24–48 hours (500–100 ml acids per gram of purified SWNTs). The temperature is controlled to be lower than 60° C.

The resulting mixture is diluted 3–4 times by pouring into distilled water and cooled to room temperature. The solid is isolated by membrane filtration (100–200 nm pore size), washed with a minimum amount of distilled water, and dried at room temperature under reduced pressure to give shortened SWNTs (40–60% yield based on purified SWNTs).

A specific example of this shortening technique is found below in Example 2.

EXAMPLE 2

0.387 g of purified SWNTs were sonicated in 40 mL of 3:1 H$_2$SO$_4$ (concentrated) to HNO$_3$ (concentrated) for 24 hours. Distilled water (200 mL) was added to the mixture, and it was filtered (membrane pore sizes 0.2 μm), washed with water and dried. Purified, shortened SWNTs: 0.273 g.

In accordance with a second, shortening technique, the purified SWNTs are stirred in a 3:1 mixture of 98% sulfuric acid and 70% nitric acid at 60–80° C. for 10–30 minutes (100 ml acid per gram of purified SWNTs). The resulting mixture is diluted 3–4 times by pouring into distilled water. After membrane filtration (200 nm pore size), the black solid is washed with distilled water, and dried at room temperature under reduced pressure.

The black solid is probe-sonicated in 5–15% ammonium persulfate aqueous solution for 6–12 hours (60–120 g ammonium persulfate per gram of purified SWNTs). After membrane filtration (200 nm pore size), washing with distilled water and ethyl alcohol, drying at room temperature under reduced pressure, the shortened SWNTs are obtained. 30–50% yield based on purified SWNTs.

The Raman spectrum of the shortened SWNTs ($\omega_r$=161, $\omega_t$=1595 cm$^{-1}$, $\omega_r$ and $\omega_t$ represent the Raman-active radial mode and tangential mode frequencies of SWNTs) is close to that of raw soot ($\omega_r$=162, $\omega_t$=1592 cm$^{-1}$). Because the Raman radial mode of the SWNTs is sensitive to the diameter, but not to the symmetry of the nanotube, based on $\omega_r$(cm$^{-1}$)=223.75 (cm$^{-1}$ nm)/d (nm), the average diameter of the shortened SWNTs in a typical sample is estimated to be 1.38 nm.

Next is the polishing of the SWNTs. This step may be applied to either shortened or unshortened SWNTs. It is hypothesized that the polishing step removes polar hydroxylic functionality from the processed SWNTs. These hydroxylic species may be physically or chemically attached to the purified, shortened or unshortened SWNTs. At the end of this treatment the SWNTs are less hydrophilic (less susceptible to forming aqueous dispersions).

Specifically, the purified shortened or unshortened SWNTs are stirred in a 4:1 mixture of 90% sulfuric acid and 30% hydrogen peroxide at 60–80° C. for 20–35 minutes (300–500 ml of liquid per gram of purified, shortened SWNTs).

The resulting mixture is diluted 3–4 times by pouring into distilled water and cooled to room temperature. After membrane filtration (100–200 nm pore size), washing with distilled water and ethyl alcohol, and drying at room temperature under reduced pressure, the polished shortened SWNTs are obtained (40–50% yield based on purified, shortened SWNTs).

Specific examples of this polishing procedure are found below in Example 3 and 4.

EXAMPLE 3

0.42 g of purified, shortened SWNTs were heated at 70° C. in 50 mL of 4:1 $H_2SO_4$ (90%) to $H_2O_2$ (30%) for 15 minutes. Water (300 mL) was added to the mixture, and it was filtered (membrane pore size 0.2 μm), washed with water and dried. Mass: 0.16 g.

EXAMPLE 4

The procedure of Example 3 is repeated using unshortened SWNTs.

The next step in the method of solubilizing is to react the carboxylic acid groups on the open ends of the polished shortened or unshortened SWNTs with an amine or alkylaryl amine having the formula $RNH_2$ or $R_1R_2$ NH, wherein R, $R_1$ and $R_2$=—$(CH_2)_n$, $CH_3$ where n=9–50 or R, $R_1$ and $R_2$=—$(C_6H_4)(CH_2)_nCH_3$ where n=5–50 via the formation of an amide linkage. To achieve this end, the polished, shortened or unshortened SWNTs are first stirred in thionyl chloride (containing 1–10% DMF) at 70–110° C. for 24–48 hours (40–60 ml of thionyl chloride per gram of SWNTs). After centrifugation, the brown-colored supernatant is decanted. The solid is washed with anhydrous THF, and after centrifugation, the supernatant is decanted. The resulting solid is dried at room temperature under reduced pressure. Yield of polished, shortened or unshortened SWNT-COCl:>90% yield based on polished, shortened or unshortened SWNTs.

Specific examples of this step are set forth below in Examples 5 and 6.

EXAMPLE 5

1.90 g of purified, shortened, polished SWNTs were heated in 40 mL of thionyl chloride ($SOCl_2$) and 12 drops of dimethylformamide (DMF), at 70° C. for 24 hours. The mixture was centrifuged at 2000 rpm for 20 minutes. The $SOCl_2$ layer was decanted, and the solid washed with tetrahydrofuran (THF). The centrifugation was repeated and the THF layer was again decanted. The solid was dried under vacuum. Mass recovered: 1.82 g.

EXAMPLE 6

The process of Example 5 is repeated using 1.90 g of purified, unshortened, polished SWNTs.

In accordance with an alternative approach, the step of terminating the SWNTs with carboxylic acid groups is rendered unnecessary by direct (noncovalent) reaction of the SWNTs with long chain amines such as octadecylamine (ODA). This alternative process is described in copending U.S. patent application (Case No. 434-231), filed concurrently herewith, and entitled "Method of Solubilizing Carbon Nanotubes in Organic Solutions", the full text of which is incorporated herein by reference. This latter process advantageously eliminates the need for pretreatment of carbon nanotubes, and does not introduce extra functionality to the SWNTs due to treatment with strong acid.

The SWNT-COCl or long chain amine-SWNT prepared as described by reference is reacted with an appropriate quantity of amine or alkylarylamine. Specifically, a mixture of the shortened or unshortened, polished SWNT-COCl or long chain amine-SWNT and excess long chain amine having a formula $RNH_2$ or $R_1R_2NH$ wherein R, $R_1$ and $R_2$=—$(CH_2)_nCH_3$ where n=9–50 or R, $R_1$ and $R_2$=—$(C_6H_4)(CH_2)_nCH_3$ where n=5–50 is heated at 70–180° C. for 48–144 hours. Examples of specific amine and alkylarylamine compounds that may be utilized in the present invention include but are not limited to nonylamine, dodecylamine, octadecylamine, tetracontylamine, pentacontylamine, 4-dodecylaniline, 4-tetradecylaniline, 4-pentylaniline, 4-pentacosylaniline, 4-tetracontylaniline and any mixtures thereof. The excess long chain amine/alkylarylamine is removed by repeated washing with ethyl alcohol. The remaining solid is treated with dichloromethane, and after filtration, the black-colored filtrate is concentrated on a rotary evaporator. Ethyl alcohol is added to the resulting concentrated solution to precipitate the SWNTs. After membrane filtration, the black solid is washed with ethyl alcohol and dried at room temperature under reduced pressure. Yield of shortened or unshortened-soluble-SWNT-long-chain-amide: 50–90%, based on polished, shortened or unshortened SWNTs.

EXAMPLE 7

1.90 g of purified, shortened, polished SWNTs were heated in 40 mL of thionyl chloride ($SOCl_2$) and 12 drops of dimethylformamide (DMF), at 70° C. for 24 hours. The mixture was centrifuged at 2000 rpm for 20 minutes. The $SOCl_2$ layer was decanted, and the solid washed with tetrahydrofuran (THF). The centrifugation was repeated and the THF layer was again decanted. The solid was dried under vacuum. Mass recovered: 1.82 g.

EXAMPLE 8

The process of Example 7 is repeated with 1.90 g of purified, unshortened, polished SWNTs.

EXAMPLE 9

0.192 grams of AP-SWNTs were heated for 72 hours at 70° C. in 2.073 grams of octadecylamine. The black mixture was dissolved in tetrahydrofuran and filtered through coarse filter paper. The filtrate was then dried under vacuum. The solid SWNTs with attached octadecylamine ligand was collected on a membrane filter (0.2 μm pore size), washed with ethanol, and dried. Mass recovered: 0.077 grams.

EXAMPLES 10–21

The procedure of Example 9 is repeated except that molar equivalent amounts of nonylamine, dodecylamine, pentacosamine, tetracontylamine, pentacontylamine, 4-pentylaniline, 4-dodecylaniline, 4-tetradocylaniline, 4-pentacosylaniline, 4-tetracontylaniline, and/or 4-pentacontylaniline are substituted for octadecylamine.

Figure 9:
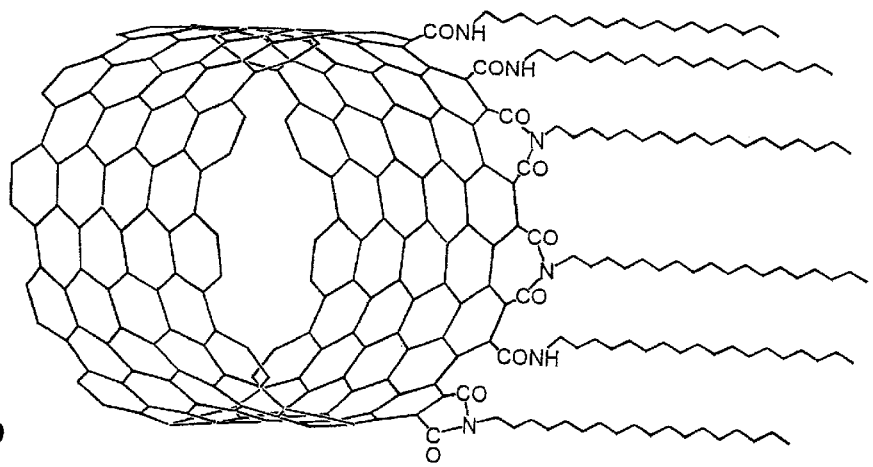
FIG. 9 schematically illustrates the structure of the end of a SWNT following functionalization.

In sharp contrast to unprocessed shortened or unshortened SWNTs which are insoluble in organic solvents, the processed shortened or unshortened SWNTs of the present invention include long alkyl chains (branched or unbranched) that provide substantial solubility in chloroform, dichloromethane, benzene, toluene, chlorobenzene and dichlorocarbene, ether, tetrahydrofuran, trichlorobenzene, methylene chloride, diethylene glycol, dimethyl ether, carbon disulfide ($CS_2$), tetrachlorocarbon, pyridine, quinoline, dichloroethane, diethyl ether, xylene, naphthalene, nitrobenzene, and mixtures thereof, (see, for example, FIG. 9). In fact, the solubilities of the processed soluble single-walled carbon nanotubes (s-SWNTs) in 1,2 dichlorobenzene and $CS_2$ are greater than 1 mg/ml. The black-colored unsaturated solution of s-SWNTs is visually non scattering, and no precipitation is observed upon prolonged standing. Like fullerenes, the s-SWNTs are insoluble in water, ethanol and acetone. The IR spectrum of soluble s-SWNTs indicates the formation of the amide bond: $v_{C=O}$= 1663 $cm^{-1}$ and 1642 $cm^{-1}$.

The following additional examples are presented to further illustrate the invention, which is not to be considered as limited thereto.

EXAMPLE 22

The s-SWNTs were prepared in accordance with the following two step procedure. First, 100 mg of shortened SWNTs were stirred in 20 ml of $SOCl_2$ [containing 1 ml dimethylformamide (DMF)] at 70° C. for 24 h. Following centrifugation, a brown-colored supernatant was decanted and the remaining solid was washed with anhydrous tetrahydrofuran (THF). Following further centrifugation, a pale yellow-colored supernatant was decanted. The remaining solid was dried at room temperature under vacuum. Second, a mixture of the resulting SWNTs and 2 g of octadecylamine (ODA, melting point 55 to 57° C.) was heated at generally 50° C. to 200° C. and more preferably 90° C. to 100° C. for 96 hours. After cooling to room temperature, the excess ODA was removed by washing with ethanol (EtOH) 4 times (5 to 10 min sonication at 40 KHz). The remaining solid was dissolved in dichloromethane, and after filtration, the black-colored filtrate was taken to dryness on a rotary evaporator. The resulting black solid was dried at room temperature under vacuum. The yield of s-SWNTs is typically greater than 60% based on shortened SWNTs.

A reaction of SWNT-COCl with excess ODA in toluene at room temperature for several days only produced trace amount of s-SWNTs. One important step contributing to the high-yield preparation of s-SWNTs in the method of the present invention is the application of heat to the mixture of SWNT-COCl and ODA for an extended period of time. During this process, the volume of the SWNTs expands several times, perhaps due to exfoliation of the SWNTs bundles to give individual nanotubes.

Proton nuclear magnetic resonance ($^1$H NMR, 200 MHz, $CDCl_3$) of s-SWNTs showed the presence of the long aliphatic chain at the ends of the SWNTs: δ0.88 (3H, t, $CH_3$), 1.23 (32H, s, 16×$CH_2$). The $CH_2$ group directly attached to the amide group at the ends of the SWNTs shows several broad signals in the range of δ2.0 to 3.5; the integral of all of these signals corresponds to 2H, which suggests the existence of magnetically different types of SWNTs in our samples.

Figure 1:
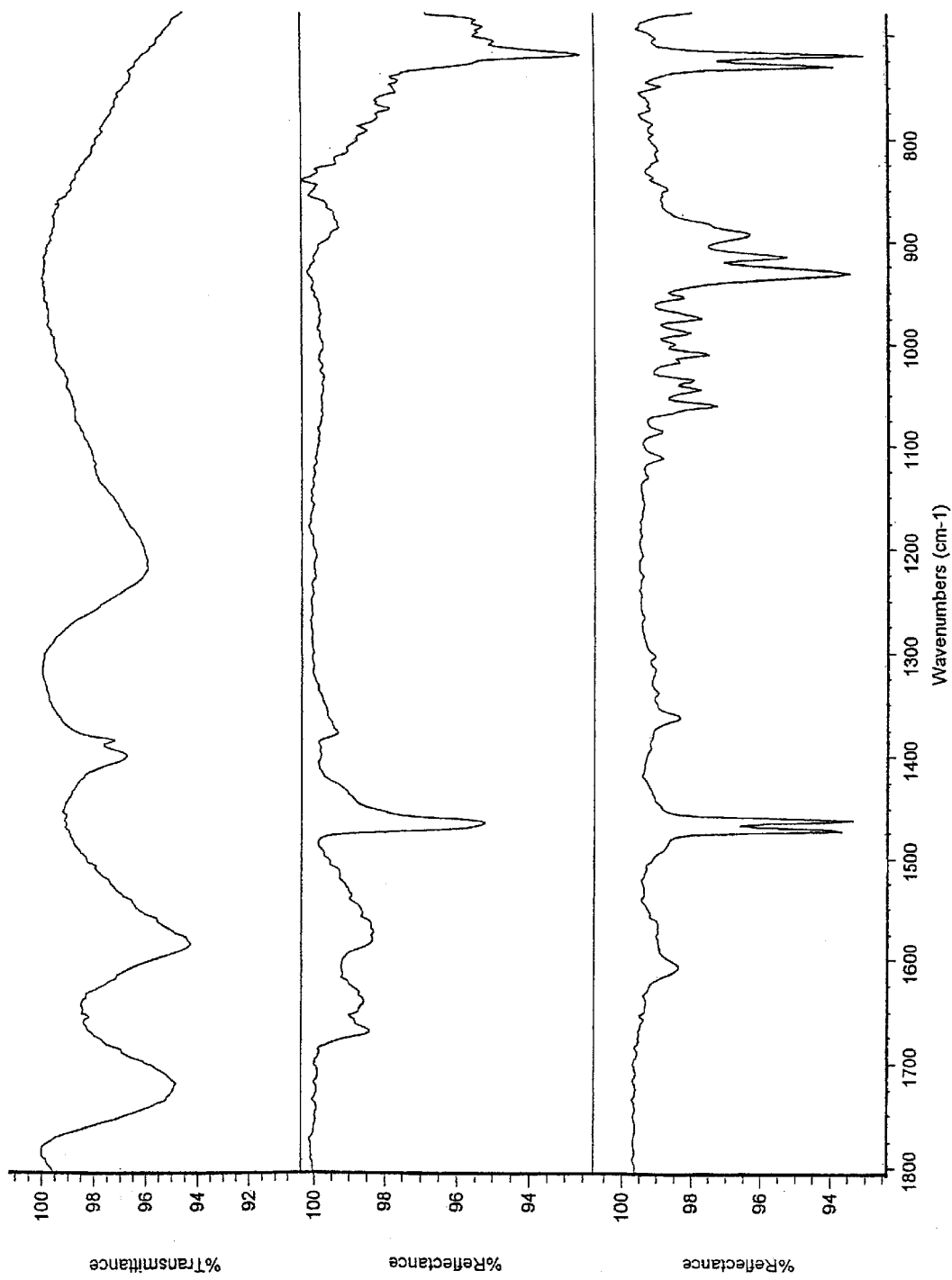
FIG. 1 is the FT-IR spectra (Nicolet Magna-IR 560 E.S.P. spectrometer), of purified SWNTs (top, KBr pellet), s-SWNTs (middle, SpectraTech Thunderdome ATR) and octadecylamine (bottom, ATR), with baseline correction.
Figure 2:
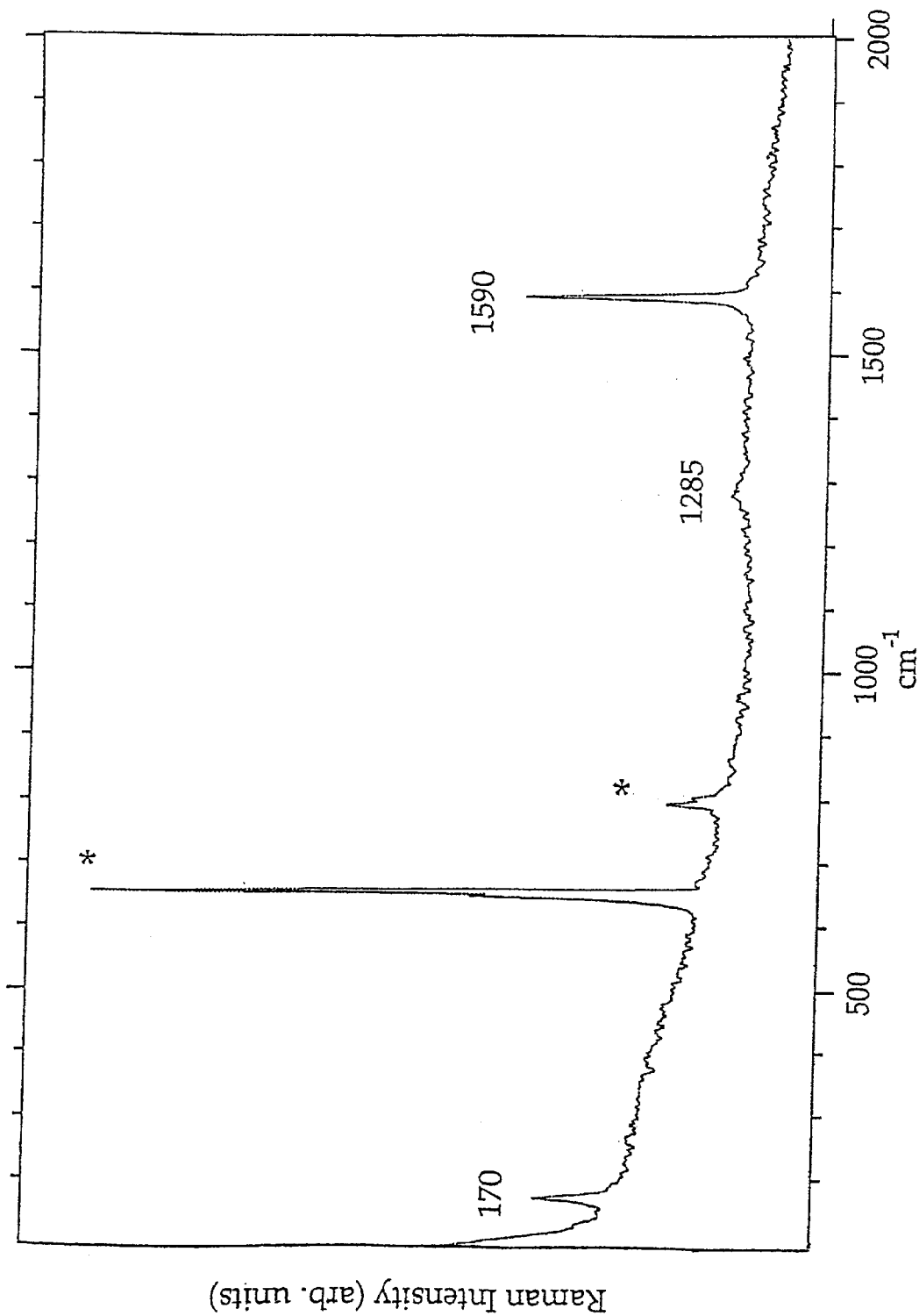
FIG. 2 is FT-Raman spectra (1064 nm excitation from Nd:YAG, BOMEM DA3 spectrometer) of s-SWNT in $CS_2$ solution having peaks labeled with an asterisk due to $CS_2$.

The Raman spectrum of the s-SWNTs in $CS_2$ solution (FIG. 2, $\omega_r$=170, $\omega_t$=1590 $cm^{-1}$) is similar to that of shortened SWNTs ($\omega_r$=161, $\omega_t$=1595 $cm^{-1}$), but the radial mode frequency is upshifted 9 $cm^{-1}$ and the tangential mode is downshifted 5 $cm^{-1}$. The origin of this difference is not clear at present. If the upshift in the radial mode frequency reflects purely the difference of nanotube average diameters, then the average diameter of s-SWNTs is estimated to be 1.31 nm. Doping also affects the radial and tangential mode frequencies of SWNTs.

Figure 3:
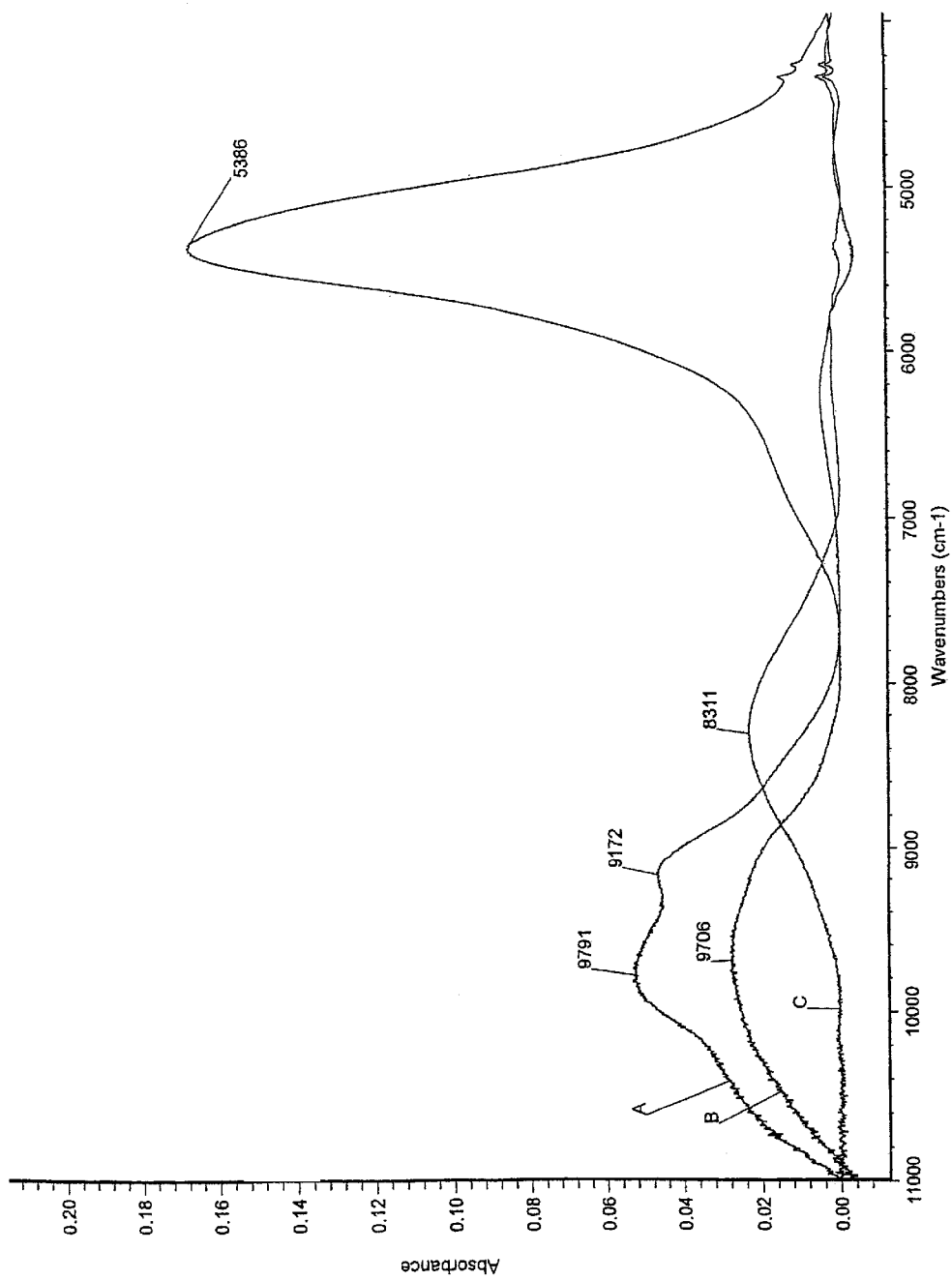
FIG. 3 is the near FT-IR spectra (quartz cell, light path 1/16 in., Nicolet Magna-IR 560 E.S.P. spectrometer) of s-SWNTs in $CS_2$ solution (A), iodine doped s-SWNTs in $CS_2$ solution (B) and bromine doped s-SWNTs in $CS_2$ solution (C). The concentration of s-SWNTs in all solutions is 0.5 mg/ml, and the solvent background was corrected. The solutions were doped to saturation.
Figure 4:
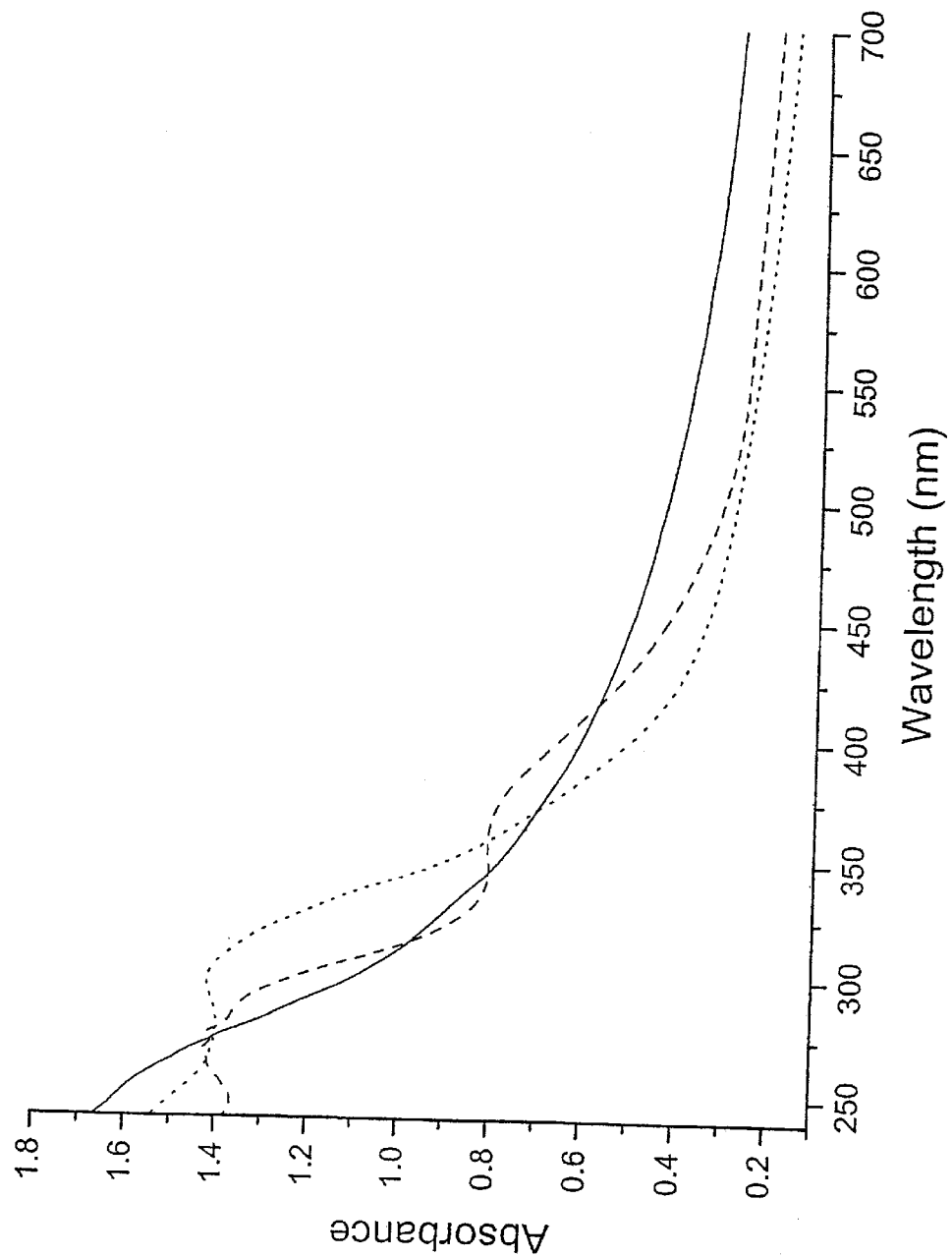
FIG. 4 is the UV-VIS spectra (quartz cell, light path 5 mm, Shimadzu UV-2501PC spectrometer) of s-SWNTs in dichloromethane (solid line, solvent corrected), iodine doped s-SWNTs in dichloromethane (dashed line, iodine and solvent corrected) and dichlorocarbene-functionalized s-SWNTs in dichloromethane (dotted line, solvent corrected). The concentration of s-SWNTs in all solutions is 0.03 mg/ml, and the solutions were doped to saturation.
Figure 5:
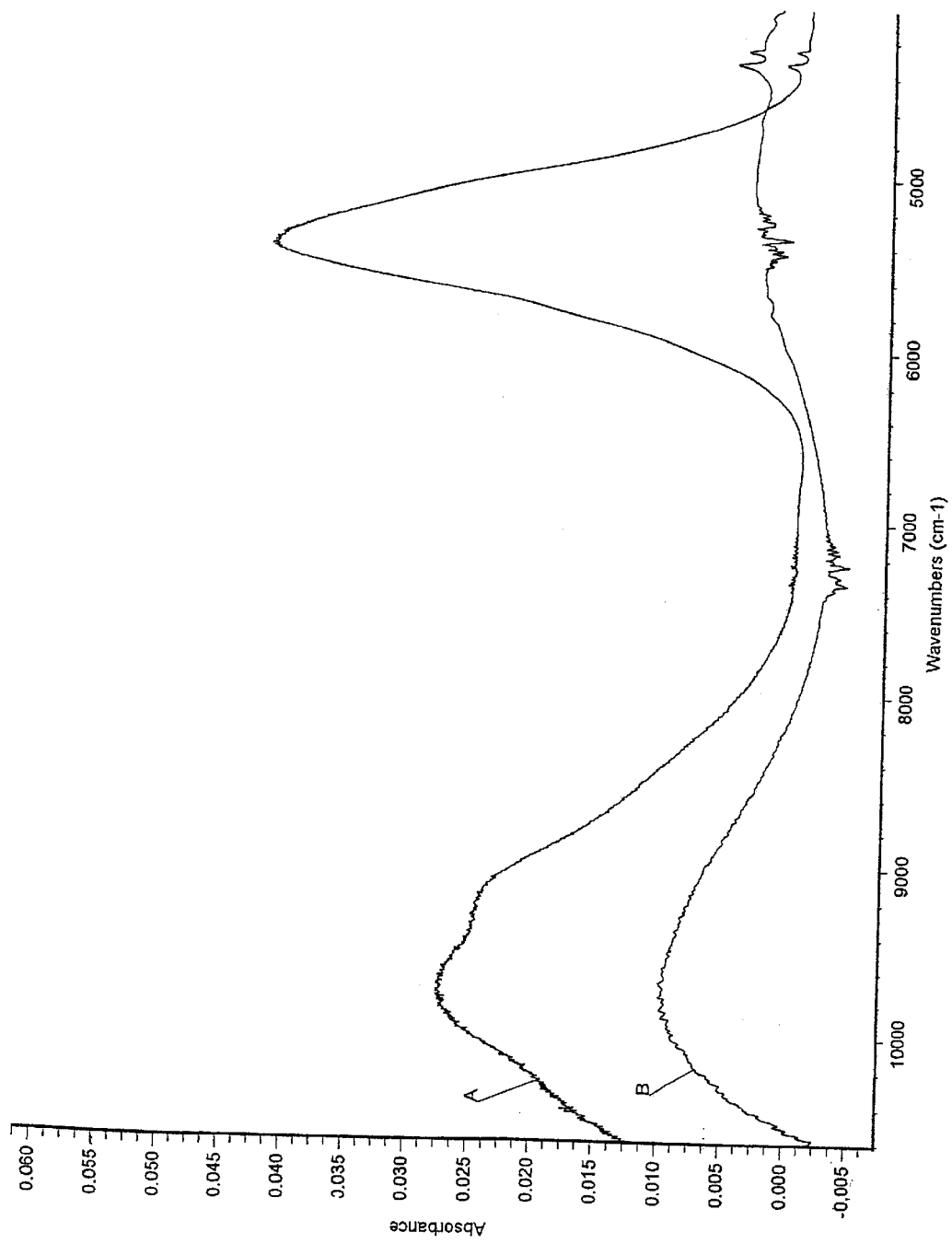
FIG. 5 is the near FT-IR spectra (quartz cell, light path 1 mm) of s-SWNTs in $CS_2$ solution (A) and dichlorocarbene-functionalized s-SWNTs in $CS_2$ solution (B), at the same weight concentration. The s-SWNTs in FIGS. 3 and 5 come from different preparations, so the relative ratio of semiconducting, chiral tubes and metallic armchair tubes is different.
Figure 7:
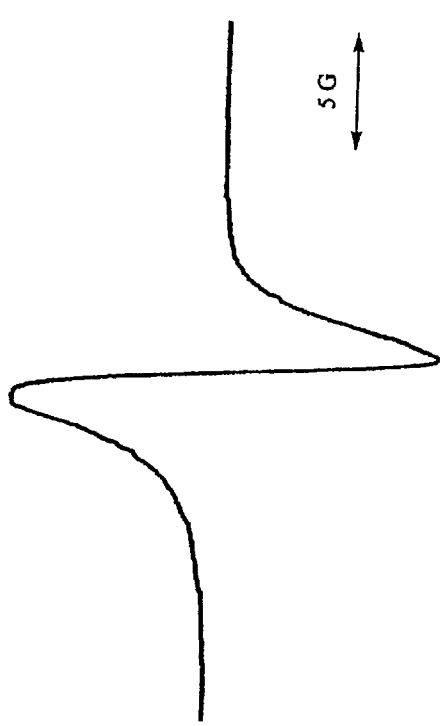
FIG. 7 is the EPR spectrum (9.4 GHz) of s-SWNT-CONH$(CH_2)_{17}CH_3$ in benzene solution at room temperature.
Figure 8:
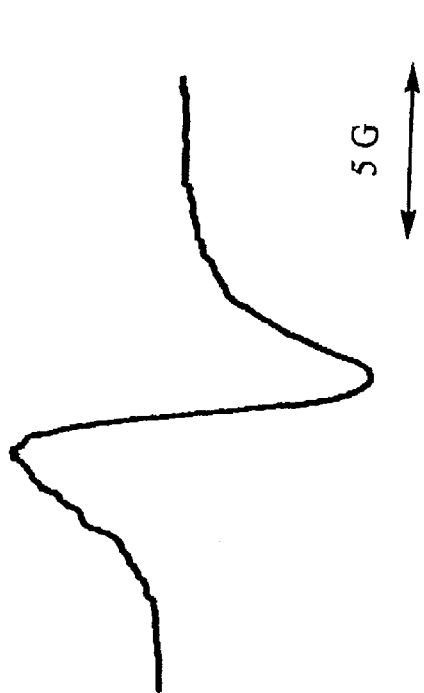
FIG. 8 refers to the EPR spectrum (9.4 GHz) of s-SWNT-CONH$(CH_2)_{17}CH_3$ in benzene solution at room temperature after doping with iodine.
Figure 6:
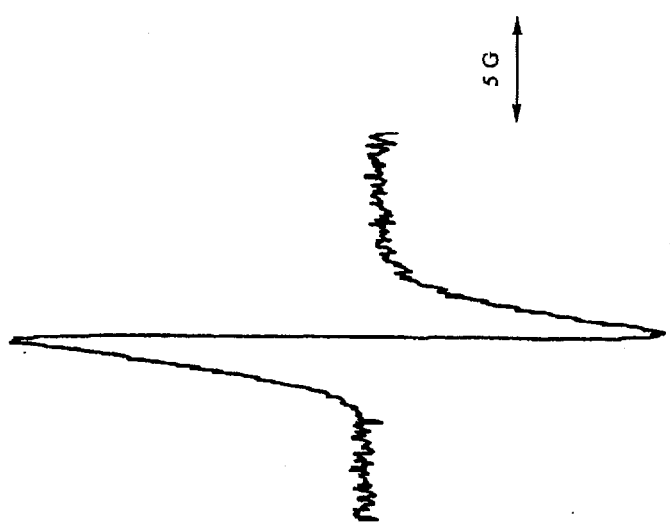
FIG. 6 is the EPR spectrum (9.4 GHz) of shortened SWNTs as an aqueous suspension at room temperature.

The s-SWNTs in $CS_2$ solution (FIG. 3) showed the presence of three major signals: 9791 $cm^{-1}$ (1.21 eV), 9172 $cm^{-1}$ (1.14 eV) and 5386 $cm^{-1}$ (0.67 eV). The signal at 0.67 eV is due to the band gap transition in semiconducting, chiral nanotubes, which was previously observed by scanning tunneling microscopy (STM) and electron energy loss spectroscopy (EELS). The signal at 1.21 eV was also observed by EELS. Although the features at 1.21 and 1.14 eV correspond to the energy separation of the second pair of singularities in the density of states (DOS) of the semiconducting, chiral SWNTs, these features are more likely to arise from metallic armchair nanotubes, because we found that the relative ratio of the 1.21/1.14 and 0.67 eV signals varies significantly in batches of s-SWNTs originating from different sources of raw soot. If the 0.67 and 1.21/1.14 eV signals came from the energy separation of the first pair and second pair of singularities in semiconducting, chiral SWNTs, then the ratio of 0.67 and 1.21/1.14 eV signals should be constant. In fact, our experimental data (e.g., d=1.31–1.38 nm, $E_{gap}$=1.21 eV, $\omega_r$=170 $cm^{-1}$) is in agreement with the calculated data for the metallic, armchair (10,10) SWNT(d=1.36 nm, $E_{gap}$=1.28 eV, $\omega_r$=165 $cm^{-1}$) which suggests that a significant proportion of our sample is (10,10) SWNTs.

The SWNTs with attached aliphatic carbon chain resulting from the present invention may be dissolved in a number of different organic solvents. Generally, aromatic or chlorinated solvents provide the best results with concentrations between 0.01 and 5.0 mg/ml solubilities being obtainable. Solvents in which solubility has been shown include but are not limited to chlorobenzene, dichlorobenzene, trichlorobenzene, tetrahydrofuran, chloroform, methylene chloride, diethylene glycol dimethyl ether, carbon disulfide, benzene, toluene, tetrachlorocarbon, pyridine, quinoline, dichloroethane, diethyl ether, xylene, naphthalene, nitrobenzene, dichloroethane, dichloromethane, dichlorocarbene, ether, and mixtures thereof.

EXAMPLE 23

Shortened SWNTs prepared as described supra in Examples 5 and 7 are added to chlorobenzene to a final concentration of 4 mg/ml, and the resulting solution is stirred for 1 hour. If necessary, the solution is filtered to remove insoluble material.

EXAMPLES 24–41

The procedure of Example 23 is repeated except that chlorobenzene is replaced with dichlorobenzene, trichlorobenzene, tetrahydrofuran, chloroform, methylene chloride, diethylene glycol dimethyl ether, carbon disulfide, benzene, toluene, tetrachlorocarbon, pyridine, quinoline, dichloroethane, diethyl ether, xylene, naphthalene, nitrobenzene, dichloroethane, dichloromethane, dichlorocarbene and ether. Final shortened SWNT concentration: 0.01–5.0 mg/ml.

EXAMPLE 42

Unshortened SWNTs prepared as described supra in Examples 6 and 8 are added to tetrahydrofuran to a final concentration of 2 mg/ml, and the resulting solution is stirred for 1 hour. If necessary, the solution is filtered to remove insoluble material.

EXAMPLES 43–45

The procedure of Example 42 is repeated except that tetrahydrofuran is replaced with dichlorobenzene, dichloromethane, and chlorobenzene. Final unshortened SWNT concentration: 0.01–5.0 mg/ml.

In summary, the method of the present invention includes the preparation of solutions of naked carbon metals and semiconductors in organic solutions including both ionic (charge transfer) and covalent solution phase chemistry with concomitant modulation of the SWNT band structure. It is now possible to obtain well-characterized, highly purified SWNT materials which are suitable for physical property measurements. The SWNTs will have a rich chemistry at their ends, the exterior walls and the interior cavity. SWNTs are versatile precursors to copolymer materials with distinctive mechanical and electrical properties and as new ligands for metal complexation.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the preferred embodiment of the present invention includes the purifying, shortening and polishing steps in order to increase product yield and purity. These individual steps are, however, optional rather than mandatory. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

What is claimed is:

1. A solution comprising single-walled carbon nanotubes reacted with an amine or alkylaryl amine having a formula $RNH_2$, or $R_1R_2NH$ wherein R, $R_1$ and $R_2$=—$(CH_2)_nCH_3$ where n=9–50 or R, $R_1$ and $R_2$=—$(C_6H_1)(CH_2)_nCH_3$ where n=5–50, said nanotubes being dissolved in a solvent selected from a group consisting of chloroform, dichloromethane, benzene, toluene, chlorobenzene, dichlorobenzene, dichlorocarbene, ether, tetrahydrofuran, trichlorobenzene, methylene chloride, diethylene glycol, dimethyl ether, carbon disulfide, tetrachlorocarbon, pyridine, quinoline, dichloroethane, diethyl ether, xylene, naphthalene, nitrobenzene and mixtures thereof.

2. The solution set forth in claim 1, wherein said single-walled carbon nanotubes are dissolved in chlorobenzene to a final concentration of from about 0.01 to 5.0 mg/ml.

3. The solution of claim 1 wherein said single-walled carbon nanotubes are dissolved in dichlorobenzene.

4. The solution set forth in claim 1, wherein said single-walled carbon nanotubes are dissolved in dichlorobenzene to a final concentration of from about 0.01 to 5.0 mg/ml.

5. The solution set forth in claim 1, wherein said single-walled carbon nanotubes are dissolved in tetrahydrofuran to a final concentration of from about 0.01 to 5.0 mg/ml.

6. The solution of claim 1 wherein said single-walled carbon nanotubes are dissolved in trichlorobenzene.

7. The solution set forth in claim 1, wherein said single-walled carbon nanotubes are dissolved in trichlorobenzene to a final concentration of from about 0.01 to 5.0 mg/ml.

8. The solution set forth in claim 1, wherein said single-walled carbon nanotubes are dissolved in chloroform to a final concentration of from about 0.01 to 5.0 mg/ml.

9. The solution of claim 1 wherein said single-walled carbon nanotubes are dissolved in methylene chloride.

10. The solution set forth in claim 1, wherein said single-walled carbon nanotubes are dissolved in methylene chloride to a final concentration of from about 0.01 to 5.0 mg/ml.

11. The solution of claim 1 wherein said single-walled carbon nanotubes are dissolved in diethylene glycol dimethyl ether.

12. The solution set forth in claim 1, wherein said single-walled carbon nanotubes are dissolved in diethylene glycol dimethyl ether to a final concentration of from about 0.01 to 5.0 mg/ml.

13. The solution of claim 1 wherein said single-walled carbon nanotubes are dissolved in carbon disulfide.

14. The solution set forth in claim 1, wherein said single-walled carbon nanotubes are dissolved in carbon disulfide to a final concentration of from about 0.01 to 5.0 mg/ml.

15. The solution set forth in claim 1, wherein said single-walled carbon nanotubes are dissolved in benzene to a final concentration of from about 0.01 to 5.0 mg/ml.

16. The solution set forth in claim 1, wherein said single-walled carbon nanotubes are dissolved in toluene to a final concentration of from about 0.01 to 5.0 mg/ml.

17. The solution of claim 1 wherein said single-walled carbon nanotubes are dissolved in tetrachlorocarbon.

18. The solution set forth in claim 1, wherein said single-walled carbon nanotubes are dissolved in tetrachlorocarbon to a final concentration of from about 0.01 to 5.0 mg/ml.

19. The solution of claim 1, wherein said single-walled carbon nanotubes are dissolved in pyridine.

20. The solution set forth in claim 1, wherein said single-walled carbon nanotubes are dissolved in pyridine to a final concentration of from about 0.01 to 5.0 mg/ml.

21. The solution of claim 1, wherein said single-walled carbon nanotubes are dissolved in dichloroethane.

22. The solution set forth in claim 1, wherein said single-walled carbon nanotubes are dissolved in dichloroethane to a final concentration of from about 0.01 to 5.0 mg/ml.

23. The solution of claim 1 wherein said single-walled carbon nanotubes are dissolved in diethyl ether.

24. The solution set forth in claim 1, wherein said single-walled carbon nanotubes are dissolved in diethyl ether to a final concentration of from about 0.01 to 5.0 mg/ml.

25. The solution of claim 1 wherein said single-walled carbon nanotubes are dissolved in xylene.

26. The solution set forth in claim 1, wherein said single-walled carbon nanotubes are dissolved in xylene to a final concentration of from about 0.01 to 5.0 mg/ml.

27. The solution of claim 1 wherein said single-walled carbon nanotubes are dissolved in napthalene.

28. The solution set forth in claim 1, wherein said single-walled carbon nanotubes are dissolved in napthalene to a final concentration of from about 0.01 to 5.0 mg/ml.

29. The solution of claim 1 wherein said single-walled carbon nanotubes are dissolved in nitrobenzene.

30. The solution set forth in claim 1, wherein said single-walled carbon nanotubes are dissolved in nitrobenzene to a final concentration of from about 0.01 to 5.0 mg/ml.

31. The solution set forth in claim 1, wherein said single-walled carbon nanotubes are dissolved in ether to a final concentration of from about 0.01 to 5.0 mg/ml.

32. The solution set forth in claim 1, wherein said single-walled carbon nanotubes are dissolved in dichloromethane to a final concentration of from about 0.01 to 5.0 mg/ml.

33. The solution set forth in claim 1, wherein said single-walled carbon nanotubes are dissolved in dichlorocarbene.

34. The solution set forth in claim 1, wherein said single-walled carbon nanotubes are dissolved in dichlorocarbene to a final concentration of from about 0.01 to 5.0 mg/ml.

35. The solution set forth in claim 1, wherein said single-walled carbon nanotubes are dissolved in quinoline.

36. The solution set forth in claim 1, wherein said single-walled carbon nanotubes are dissolved in quinoline to a final concentration of from about 0.01 to 5.0 mg/ml.

* * * * *

UNITED STATES PATENT AND TRADEMARK OFFICE
CERTIFICATE OF CORRECTION

PATENT NO. : 6,641,793 B2
DATED : November 4, 2003
INVENTOR(S) : Robert C. Haddon et al.

It is certified that error appears in the above-identified patent and that said Letters Patent is hereby corrected as shown below:

<u>Column 11,</u>
Line 40, replace "$R_2 = - (C_6H_1)(CH_2)_nCH_3$" with -- $R_2 = - (C_6H_4)(CH_2)_nCH_3$ --.

Signed and Sealed this

Thirteenth Day of December, 2005

JON W. DUDAS
*Director of the United States Patent and Trademark Office*